Dec. 28, 1965  L. GOERNER  3,225,854
ENGINE DRIVE ARRANGEMENT FOR A BICYCLE
Filed March 23, 1964  2 Sheets-Sheet 1

INVENTOR.
Leighton Goerner
BY Bedell and Burgess
atty's.

Dec. 28, 1965 L. GOERNER 3,225,854
ENGINE DRIVE ARRANGEMENT FOR A BICYCLE
Filed March 23, 1964 2 Sheets-Sheet 2

INVENTOR
Leighton Goerner
BY Bedell and Burgess
attys.

United States Patent Office
3,225,854
Patented Dec. 28, 1965

3,225,854
ENGINE DRIVE ARRANGEMENT FOR A BICYCLE
Leighton Goerner, 8826 Big Bend, Webster Groves, Mo.
Filed Mar. 23, 1964, Ser. No. 354,032
9 Claims. (Cl. 180—33)

The invention relates to the ready mounting of an engine and driving mechanism upon an ordinary bicycle to operate the bicycle through the rear wheel.

Among the objects of the invention are to assemble a small engine unit with a bicycle without requiring special bicycle frame structure or machine work on the bicycle frame; to provide for ready application and removal of the engine and its mounting to and from the frame; to simplify adjustment of the position of the engine and driving structure relative to the frame and rear wheel; to facilitate secure mounting of the engine and driving structure on the frame between the bicycle saddle and the pedal sprocket and preferably mounting the structure solely on the upright seat mast positioned between the wheels; to provide for maintaining a desired amount of traction pressure through adjustment of the driving mechanism on the bicycle rear wheel; and to facilitate ready engagement and disengagement of the engine driving mechanism and the bicycle rear wheel.

In the accompanying drawings illustrating the invention:

Figure 1:
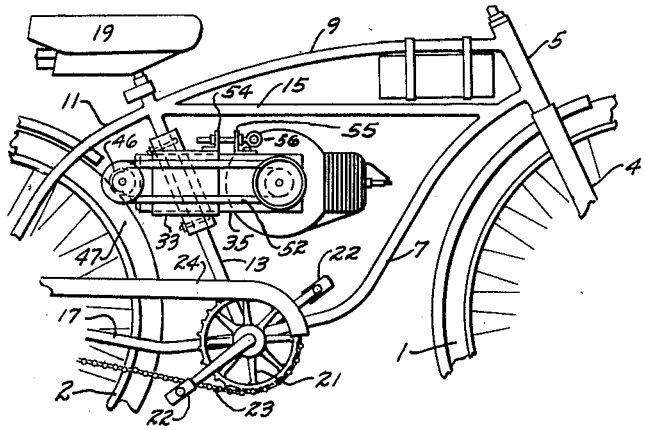
FIG. 1 is a side elevation of the major portion of a bicycle and shows the engine and drive structure mounted on the bicycle frame.
Figure 2:
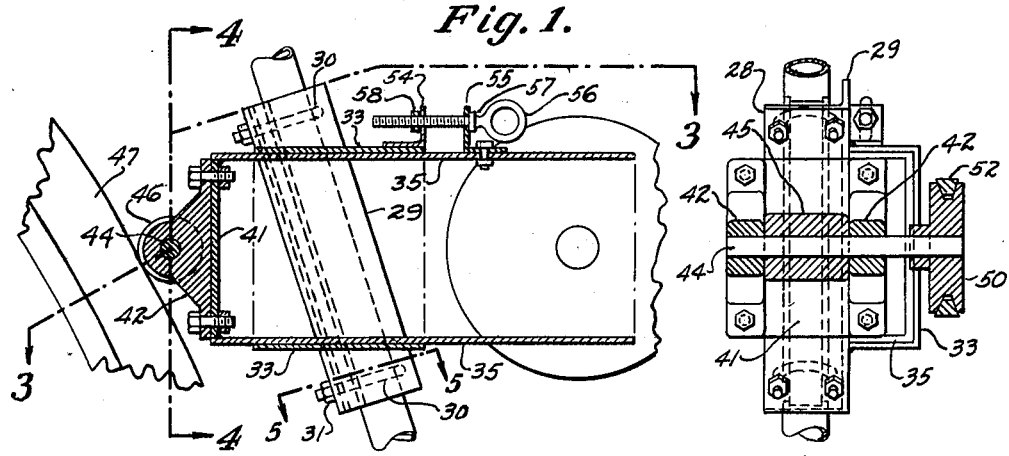
FIG. 2 is in part a side elevation of the engine mounting portion of FIG. 1, but drawn to a larger scale and, in part, a vertical section on line 2—2 of FIG. 3.
Figure 4:
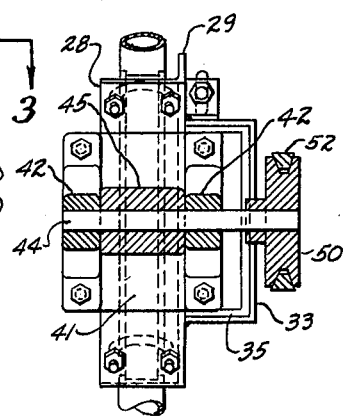
FIG. 4 is a vertical transverse section on line 4—4 of FIG. 2.

The bicycle includes front and rear wheels 1, 2, respectively, a frame front fork 4 and bearing 5, a lower diagonal 7, a top bar 9, a rear diagonal 11, a substantially upright seat column or mast 13 and, preferably, a horizontal brace bar 15 and a lower rear wheel fork 17. FIG. 1 also shows a saddle 19, a drive sprocket 21, pedals 22, a drive chain 23 and a chain guard 24. All these parts are of any well known bicycle construction and are not necessarily varied, supplemented or machined in any way because of the engine mounting applied to the bicycle.

Figure 3:
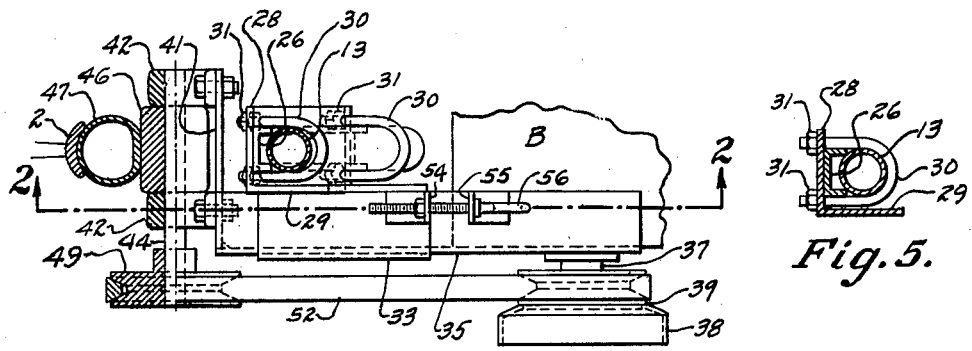
FIG. 3 is a horizontal section and top view approximately on line 3—3 of FIG. 2.
Figure 5:
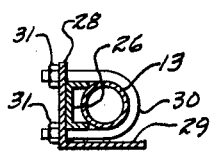
FIG. 5 is a detail horizontal section on line 5—5 of FIG. 2.

The base of the engine mounting comprises a channel section 26 comprising a web and flanges, the width of the channel over the flanges corresponding generally to the diameter of the frame seat mast 13. The edges of the channel are applied to the rear portion of the seat mast (FIG. 3). An angle iron having a flange 28 is welded to the back of the channel web. U-bolts 30 receive mast 13 between their legs which extend alongside the channel flanges and through angle flange 28 and are provided with nuts 31 which are tightened to clamp the channel and angle iron to the seat mast. A horizontally disposed channel 33 has the edges of its flanges welded to the other leg 29 of the angle and forms therewith a stationary box section bracket or bearing which slidably receives a horizontally disposed elongated channel 35, to the forward end of which is bolted the engine block B. Engine crankshaft 37 extends through the web of channel 35 and mounts a centrifugal clutch 38 and a belt drive pulley 39.

The rear end of channel 35 mounts a yoke 41 having bearings 42 for the axle 44 of a drive roller 46 which engages the tire 47 of the rear wheel. A driven pulley 49 on the outer end of axle 44 is connected by a belt 52 to pulley 39.

Welded or otherwise secured to bracket channel 33 and to engine mounting channel 35 are upstanding ears 54, 55, respectively. An adjustment member in the form of an eyebolt 56 has a boss 57 which bears against ear 55. The eyebolt is threaded through a nut 58 secured to ear 54. Rotation of the eyebolt adjusts channel 35 lengthwise of channel 33 and moves driving roller 46 toward or from the axis of the bicycle rear wheel.

Figure 6:
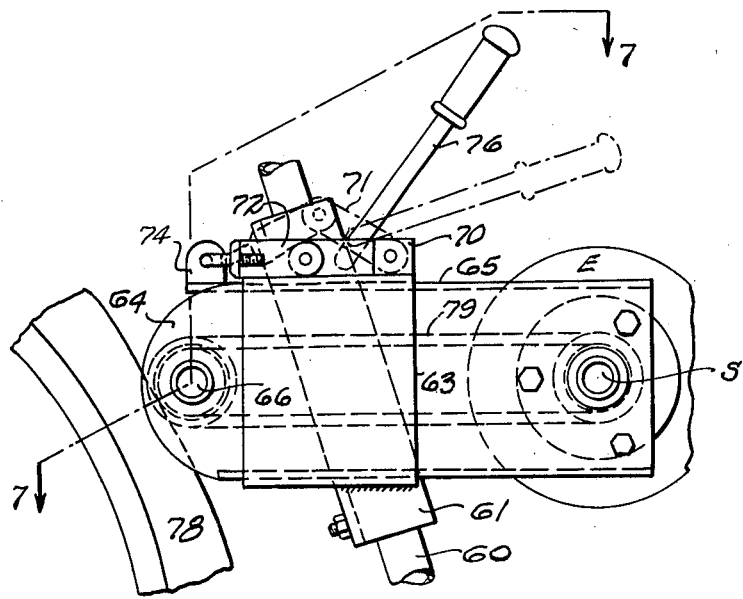
FIG. 6 is a side elevation and section corresponding to FIG. 2 but illustrating another form of the invention.
Figure 7:
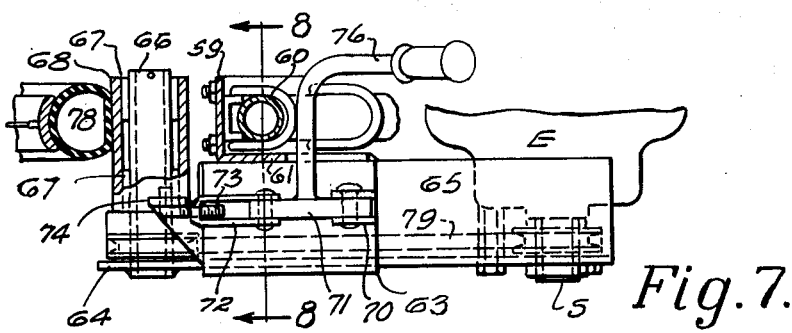
FIG. 7 is a transverse section on line 7—7 of FIG. 6.
Figure 8:
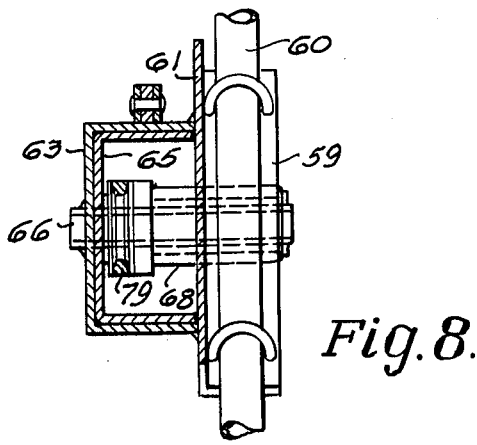
FIG. 8 is a vertical transverse section on line 8—8 of FIG. 7.

FIGS. 6, 7 and 8 show another form of the invention in which the mounting angle has a flange 59 clamped to the seat mast 60 by U-bolts corresponding to U-bolts 30 previously described and has a flange 61 which forms, with bracket channel 63, a stationary box section support for the elongated sliding carrier channel 65, the right hand end of which mounts the engine E. The engine drive shaft S is journaled in the upright web of channel 65. The left hand end of the upright web of bracket channel 63 is extended at 64 and the outer end of a shaft 66 is welded to the web and mounts needle bearings 67 for the drive roller 68.

A pair of upstanding posts 70 on channel 63 pivotally mounts a toggle link 71 to which one end of a toggle clevis 72 is pivoted, the other end of clevis 72 being adjustably connected by an L head bolt 73 to a post 74 on channel 65. A lever 76, rigid with link 71, is readily shifted by the rider to actuate the toggle and slide carrier 65 to engage and disengage roller 68 and wheel tire 78.

In this form of the invention the flanges of mounting channel 63 and carrier channel flanges are widened and enclose the pulleys on the engine and roller shafts and the belt 79 between them.

This arrangement provides a friction clutch which the rider may readily engage and disengage while coasting or in the event of low gas supply or even engine failure.

In both forms of the invention the movement of the carrier member to and from the bicycle wheel along the extended bearings on the bracket is readily controlled by adjustments of bolts 56 and 73 and the friction drive pressure on the wheel is wholly independent of the weight of the motor. The bracket channel and its U-bolt clamps may be readily applied to the upright seat mast of the frame, and may be removed therefrom, without any machine work on the frame and the only tool required is a simple wrench for the U-bolt nuts. This makes the device commercially acceptable particularly to those who may not have power tools or machinsts available or who prefer to handle the installation personally.

The details of the structure may be varied substantially without departing from the spirit of the inventiton and the exclusive use of those modifications coming within the scope of the claims is contemplated.

What is claimed is:

1. In combination, a bicycle including front and rear wheels and a frame carried thereby and having a single upright column forming a seat mast, there being a saddle on said mast, a power drive-mounting comprising a stationary member fixedly secured to said upright column, a carrier member slidable horizontally on said stationary member below and adjacent a horizontally disposed upper part of said frame, an engine on said carrier member in front of said column and movable forwardly and rearwardly of the bicycle, a wheel-engageable friction roller journaled on said carrier member and operatively connected to said engine, and a device mounted directly on said members and readily actuated manually for adjusting and holding said members in selected position relative to each other lengthwise of said frame.

2. A bicycle combination according to claim 1 in which the adjusting and holding device includes a manually operable hand lever pivotally connected to the stationary member and projecting upwardly adjacent to the bicycle top frame part.

3. A bicycle engine mount according to claim 1 in which the adjusting device comprises a toggle including interpivoted links pivoted respectively to said mounting and carrier members and a manually operable lever for actuating the toggle links.

4. A combination according to claim 1 in which the device for adjusting said members relative to each other is positioned above said members.

5. A combination according to claim 1 in which the stationary mounting member is applied directly to the upright column, and U-bolts surround said column and clamp the stationary member to said column.

6. In combination, a bicycle having front and rear wheels and a frame upright part in front of the rear wheel, an elongated channel member with opposed faces of its flanges applied to said frame part, vertically spaced U-bolts enclosing said frame part and extending therefrom alongside the channel member flanges, a bracket member secured to the back of the channel web and receiving the legs of said U-bolts, nuts on the U-bolt legs clamping said frame part between the channel member and the crosspieces of the U-bolts, said bracket member including an elongated horizontal bearing extending fore and aft of said frame part, a carrier member slidable along said bearing, an engine in front of said frame part and mounted on said carrier member with a shaft extending transversely of the bicycle and having a pulley, a driving roller journaled on said carrier member and normally engaged with the bicycle rear wheel with the roller axis extending transversely of the bicycle and having a pulley spaced from the wheel, a belt connecting said pulleys, and a manually operable adjustment device mounted on said bracket member and engaging said carrier member to position the driving roller relative to said rear wheel.

7. In combination with a bicycle including front and rear wheels and a frame with a horizontally disposed upper part and an upright seat mast part, a mounting bracket attached to said seat mast part, a horizontally elongated carrier of channel cross section slidable lengthwise horizontally on said bracket and having a vertically disposed web spaced laterally from the bicycle frame and provided with horizontal upper and lower flanges projecting from the web toward the frame, an engine mounted on said carrier and including a rotating shaft extending transversely of the bicycle frame and having a drive pulley adjacent to said web and between said flanges, a wheel engageable roller having a mounting shaft extending transversely of the bicycle frame and having a driven pulley adjacent said web near the other end thereof, a belt mounted on said pulleys, said pulleys and belt being enclosed within said member web and flanges, and a lever pivoted on said carrier and projecting upwardly therefrom and having connections to said bracket and carrier for manually shifting the latter lengthwise of the bicycle.

8. A bicycle engine mount comprising an angle bracket, means for attaching one flange of the bracket to a bicycle upright frame part, said means including a U-bolt with threaded legs extending through said angle flange and provided with nuts to draw the U-bolt toward said flange, a bearing member of channel cross section with an upright web and with vertically spaced flanges the edges of which are secured to the other flange of said angle bracket and form therewith a box section support, an elongated carrier slidable lengthwise horizontally in said support, an engine drive shaft and pulley and a wheel-driving roller and pulley journaled on said carrier, a driving belt applied to said pulleys, said pulleys and belt being housed within said carrier, and a device mounted on said support for moving and holding said carrier in selected position in said support.

9. A bicycle engine mount comprising an angle bracket, means for attaching one flange of the bracket to a bicycle upright frame part, said means including a U-bolt with threaded legs extending through said angle flange and provided with nuts to draw the U-bolt toward said flange, a bearing member of channel cross section with an upright web and with vertically spaced flanges the edges of which are secured to the other flange of said angle bracket and form therewith a box section support, an elongated carrier slidable lengthwise horizontally in said support, an engine drive shaft and pulley and a wheel-driving roller and pulley journaled on said carrier, a driving belt applied to said pulleys, and a device mounted on said support for moving and holding said carrier in selected position in said support.

References Cited by the Examiner

UNITED STATES PATENTS

| | | | |
|---|---|---|---|
| 715,889 | 12/1902 | Smith. | |
| 1,158,311 | 10/1915 | Schunk | 180—33 |
| 1,436,788 | 11/1922 | Baker | 180—33 |
| 2,409,887 | 10/1946 | Murphy | 180—33 |
| 2,468,763 | 5/1949 | Landry | 280—301 |
| 2,488,613 | 11/1949 | Woolsey et al. | 180—33 |
| 2,638,172 | 5/1953 | Borchin et al. | 74—207 X |

FOREIGN PATENTS 686,538   5/1950   Great Britain.

KENNETH H. BETTS, *Primary Examiner.*